US012507027B2

(12) United States Patent
Horikoshi et al.

(10) Patent No.: US 12,507,027 B2
(45) Date of Patent: Dec. 23, 2025

(54) INFORMATION PROCESSING APPARATUS, INFORMATION PROCESSING APPARATUS CONTROL METHOD, AND PROGRAM

(71) Applicant: SONY INTERACTIVE ENTERTAINMENT INC., Tokyo (JP)

(72) Inventors: Hajime Horikoshi, Tokyo (JP); Yuki Karatsu, Tokyo (JP); Shunsuke Saito, Tokyo (JP); Kaoru Yamanoue, Tokyo (JP); Yoshimichi Kitaya, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 253 days.

(21) Appl. No.: 18/032,906

(22) PCT Filed: Oct. 29, 2021

(86) PCT No.: PCT/JP2021/040113
§ 371 (c)(1),
(2) Date: Apr. 20, 2023

(87) PCT Pub. No.: WO2022/097583
PCT Pub. Date: May 12, 2022

(65) Prior Publication Data
US 2023/0388735 A1 Nov. 30, 2023

(30) Foreign Application Priority Data
Nov. 6, 2020 (JP) ................................ 2020-186054

(51) Int. Cl.
*H04S 7/00* (2006.01)
*H04R 5/04* (2006.01)

(52) U.S. Cl.
CPC ............... *H04S 7/303* (2013.01); *H04R 5/04* (2013.01)

(58) Field of Classification Search
CPC ................................. H04S 7/303; H04R 5/04
See application file for complete search history.

(56) References Cited

U.S. PATENT DOCUMENTS 9,066,055 B2 * 6/2015 McCartney .............. H04B 3/54
2019/0335286 A1 * 10/2019 Suenaga .................. H04R 5/04

FOREIGN PATENT DOCUMENTS

JP 2020156108 A 9/2020
KR 1020080011858 A 2/2008
WO 2017209196 A1 12/2017

OTHER PUBLICATIONS

International Search Report and Written Opinion mailed Dec. 21, 2021, from PCT/JP2021/040113, 9 sheets.

* cited by examiner

*Primary Examiner* — Andrew Sniezek
(74) *Attorney, Agent, or Firm* — Fish & Richardson P.C.

(57) ABSTRACT

An information processing apparatus processes an audio signal and is connected to a speaker system having a plurality of speakers. The information processing apparatus receives input of audio output setting information indicating the direction of each speaker of the speaker system relative to an orientation of a user, records the received audio output setting information, and outputs the recorded audio output setting information as requested for use in processing the audio signal.

18 Claims, 5 Drawing Sheets

FIG. 4

NUMBER OF SPEAKERS: 7

| SPEAKERS | ANGULAR RANGES | DEFAULT INITIAL VALUES |
|---|---|---|
| FRONT LEFT | -15° to -45° | -30° |
| FRONT RIGHT | +15° to +45° | +30° |
| SURROUND LEFT | -80° to -120° | -90° |
| SURROUND RIGHT | +80° to +120° | +90° |
| SURROUND BACK LEFT | -120° to -160° | -135° |
| SURROUND BACK RIGHT | +120° to +160° | +135° |
| CENTER | -5° to +5° | 0° |

FIG. 5

(a)

AUDIO OUTPUT SETTING INFORMATION
FRONT LEFT: -30°, FRONT RIGHT: +30°, SURROUND LEFT: -110° ⋯

(b)

VIDEO DISPLAY DEVICE: aaaa
AUDIO OUTPUT SETTING INFORMATION
FRONT LEFT: -30°, FRONT RIGHT: +30° ⋯

VIDEO DISPLAY DEVICE: bbbb
AUDIO OUTPUT SETTING INFORMATION
FRONT LEFT: -40°, FRONT RIGHT: +20° ⋯

⋮

FIG. 6
(a)
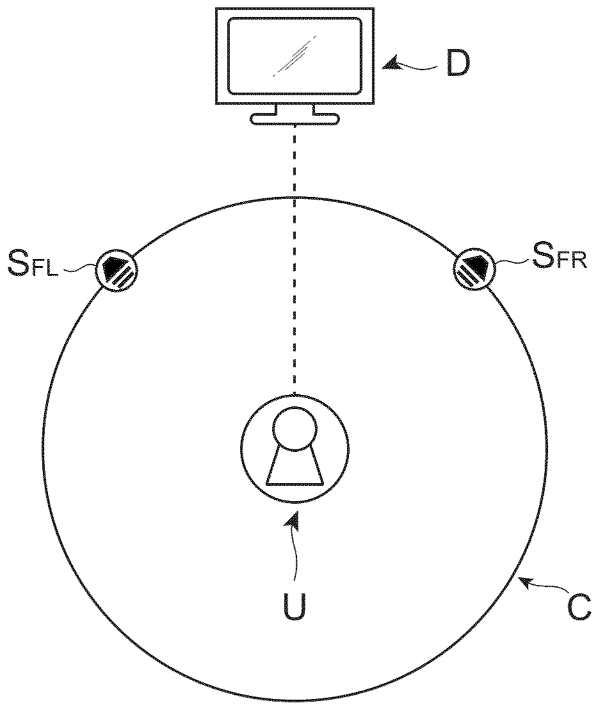
(b)
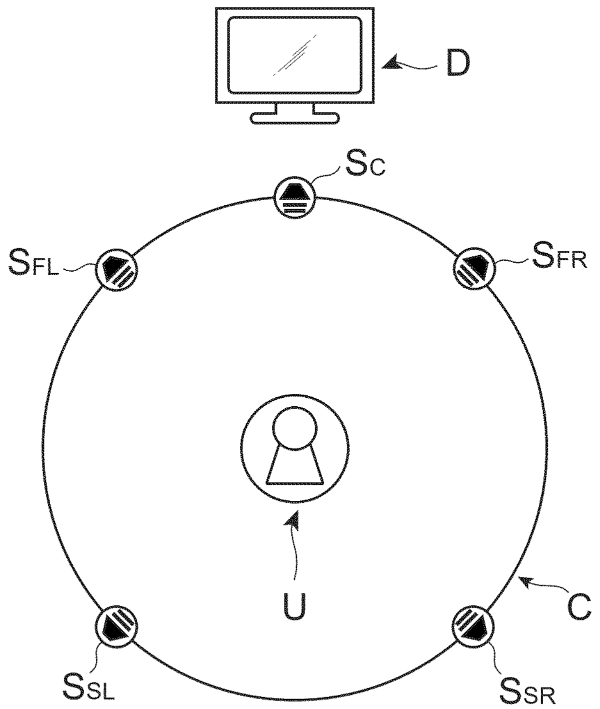

INFORMATION PROCESSING APPARATUS, INFORMATION PROCESSING APPARATUS CONTROL METHOD, AND PROGRAM

TECHNICAL FIELD

The present invention relates to an information processing apparatus, an information processing apparatus control method, and a program.

BACKGROUND ART

Audio systems for audiovisual equipment used by users viewing videos or playing games include, besides the 2-channel audio system capable of reproducing stereo sound, 5.1 channel audio systems and 7.1 channel audio systems having a larger number of speakers placed around the user to enhance a sense of presence.

SUMMARY

Technical Problem

Due to space constraints on the placement of speakers, for example, however, the speakers may not be ideally positioned around the user. The audio system in use may also differ from one user to another. In order to optimize acoustics for applications designed to reproduce videos and sounds or to play games, there has been a demand for acquiring information regarding the positions in which to place the speakers for the user of such applications.

The present invention has been made in view of the above circumstances. An object of the invention is therefore to provide an information processing apparatus, an information processing apparatus control method, and a program for acquiring and offering the information regarding the positions in which to place the speakers for the user.

Solution to Problem

In solving the foregoing problems of the related art and according to one embodiment of the present invention, there is provided an information processing apparatus that processes an audio signal and is connected to a speaker system having a plurality of speakers. The information processing apparatus includes reception means that receives input of audio output setting information indicating a direction of each of the speakers of the speaker system relative to an orientation of a user, and recording means that records the received audio output setting information. The recorded audio output setting information is output as requested for use in processing the audio signal.

Advantageous Effects of Invention

The present invention makes it possible to acquire and offer the information regarding the positions in which to place the speakers for the user.

BRIEF DESCRIPTION OF DRAWINGS

FIG. 4 is an explanatory diagram depicting an example of information held by the information processing apparatus according to the embodiment of the present invention.

FIG. 5 depicts explanatory diagrams of an example of audio output setting information recorded by the information processing apparatus according to the embodiment of the present invention.

FIG. 6 depicts explanatory diagrams of other examples of the setting screen displayed by the information processing apparatus according to the embodiment of the present invention.

DESCRIPTION OF EMBODIMENT

Figure 1:
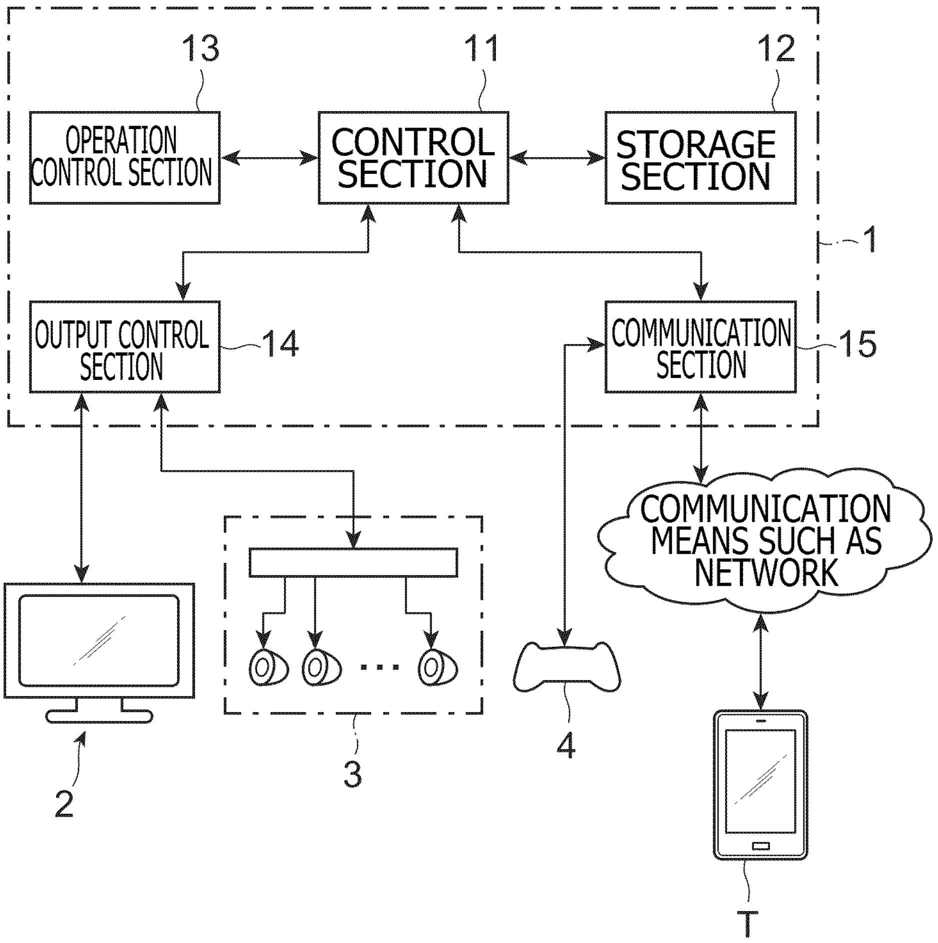
FIG. 1 is a block diagram depicting a configuration example and a connection example of an information processing apparatus according to an embodiment of the present invention.

An Embodiment of the present invention is described below with reference to the accompanying drawings. As depicted in FIG. 1, an information processing apparatus 1 according to the present invention includes a control section 11, a storage section 12, an operation control section 13, an output control section 14, and a communication section 15. An audio signal processing apparatus 1 is connected to a video display device 2 such as a home-use television set or a monitor, a speaker system 3 including a plurality of speakers, and a controller 4 operated by the user.

The control section 11 is a program-controlled device such as a CPU (Central Processing Unit) that executes programs stored in the storage section 12. Besides executing a system program, the control section 11 of this embodiment carries out application programs such as game applications under control of the system program. The control section 11 further receives input of information indicating the direction of each speaker of the speaker system 3 relative to the orientation of the user, and performs a process of recording the received information as settings. During execution of an application program, the control section 11 receives a request for the settings recorded in the above-mentioned process. In response to the request as a process of the system program, the control section 11 provides the recorded settings to the application program for use in audio signal processing. The operations of the control section 11 will be discussed later in detail.

The storage section 12 may be a memory device or a disk device, for example. The storage section 12 holds the programs to be executed by the control section 11 as well as various setting information for use by the control section 11. The storage section 12 also functions as a work memory for the control section 11.

The operation control section 13 communicates with the controller 4 used by the user by way of the communication section 15. The operation control section 13 receives information indicating the details of the operations carried out by the user on the controller 4, and outputs the received information to the control section 11.

In accordance with instructions from the control section 11, the output control section 14 outputs a video signal to the video display device 2 such as a home-use television set or a monitor. Also, in keeping with instructions from the control section 11, the output control section 14 outputs an audio signal generated by the control section 11 to the speaker system 3.

The communication section 15 includes a network interface that communicates with a terminal device (mobile phone such as a smartphone or another information processing apparatus) T over a network. The communication section 15 also includes a proximity communication interface such as Bluetooth (registered trademark) that sends and receives signals to and from the controller 4 under instructions input from the control section 11.

Figure 2:
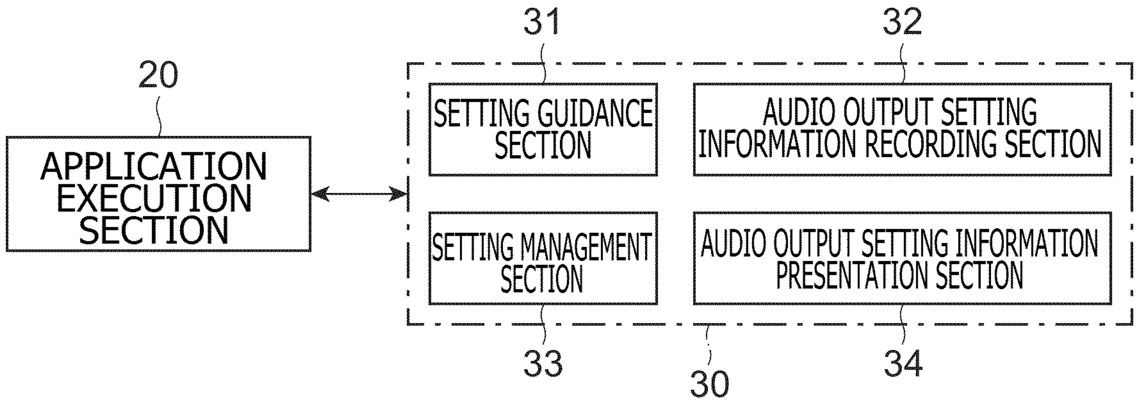
FIG. 2 is a functional block diagram depicting an example of the information processing apparatus according to the embodiment of the present invention.

The operations of the control section 11 are explained next. In an example of this embodiment, the control section 11 operates in accordance with the programs held in the storage section 12 so as to functionally implement a configuration including an application execution section 20 and a system processing section 30, as depicted in FIG. 2.

Also, in this embodiment, the system processing section 30 includes a setting guidance section 31, an audio output setting information recording section 32, a setting management section 33, and an audio output setting information presentation section 34.

The application execution section 20 performs various processes in accordance with instructions from the programs including game applications. Given an instruction from a program such as a game application to acquire the audio output setting information, the application execution section 20 requests the audio output setting information from the system processing section 30. Upon receipt of the audio output setting information from the system processing section 30 in response to the request, the application execution section 20 subjects the received audio output setting information to processing by the program such as the game application.

Upon receipt of an instruction from the user to make audio settings on the system, the setting guidance section 31 in the system processing section 30 instructs the output control section 14 to display an audio setting menu list. In an example of this embodiment, the items included in the menu list are assumed to be selectable by the user operating the controller 4. Also, the items include those of audio output setting for setting the positions of the speakers. The user operates the controller 4 to select an appropriate audio output setting item from the menu list and further operates the controller 4 to make the setting. This causes the setting guidance section 31 to display an audio output setting screen such as one depicted in FIG. 3.

Figure 3:
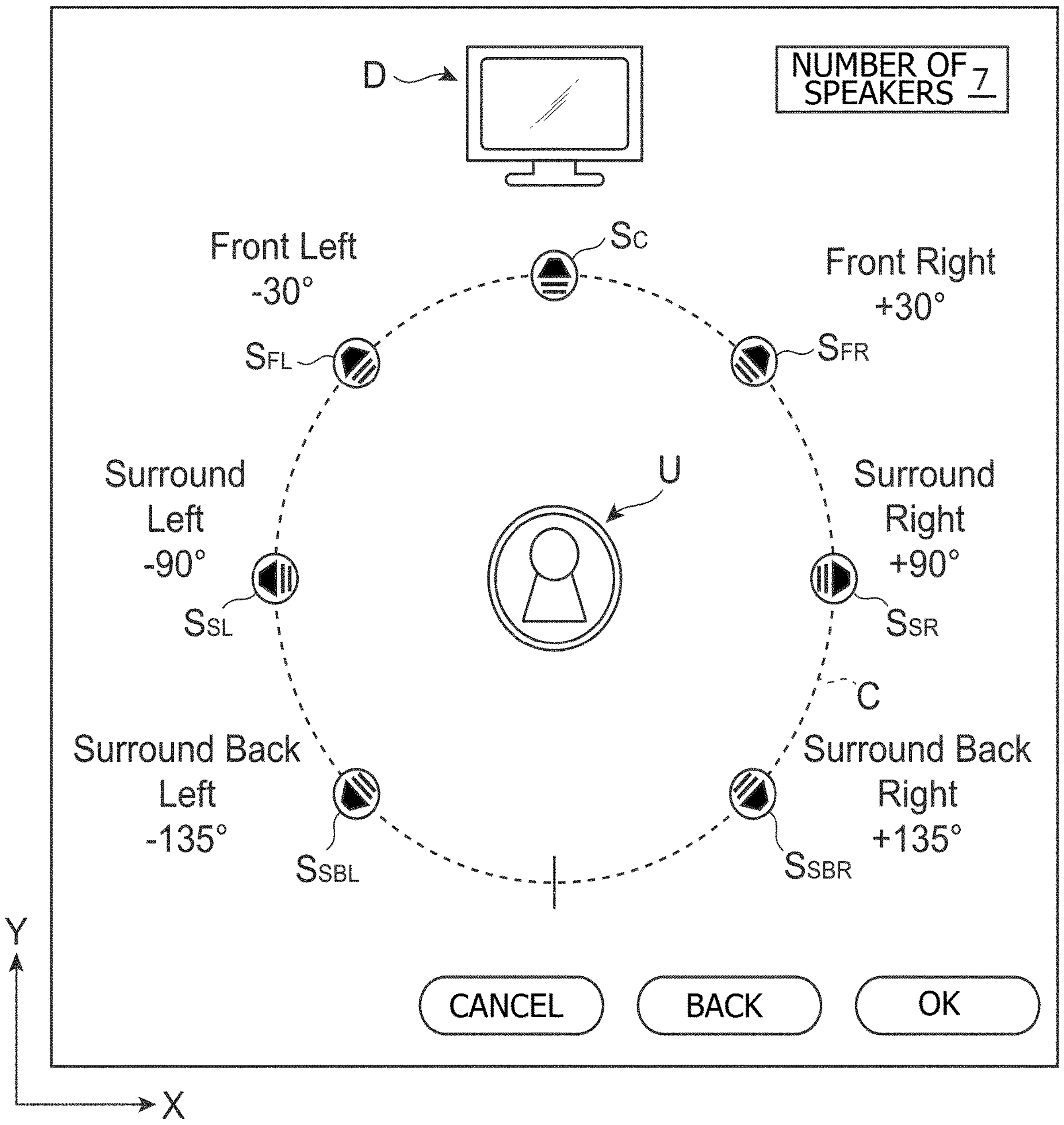
FIG. 3 is an explanatory diagram depicting an example of a setting screen displayed by the information processing apparatus according to the embodiment of the present invention.

In the example of the audio output setting screen in FIG. 3, a circle (C) is displayed centering on a user icon (U) representing the position of the user. Also displayed is an icon (D) indicating the video display device 2 such as a display unit or a monitor positioned in the middle (center) of the upper part of the screen (in the positive direction on the Y axis in FIG. 3). Each speaker of the speaker system 3 is represented by an icon on the circle (C). That is, as many icons as the number of the speakers are displayed.

The direction from the user position (U) to the position (D) of the video display device 2 is assumed to be the reference direction as viewed from the user. The user moves the icon of the corresponding speaker on the circle (C) to set the angle of its point thereon relative to the reference direction centering on the user position (U), thereby setting information regarding an angular direction in which each speaker of the speaker system 3 is placed. However, this is only an example. In another example, the user may input the value of the angle at which each speaker is to be placed, either directly or by selection of a relevant menu.

Incidentally, it is assumed that the number of the displayed icons for the speakers is input and set by the user. In one example, the user is assumed to select the number of speakers from 2, 5, and 7.

If the user selects the speaker count of "7," for example, the setting guidance section 31 displays, as depicted in FIG. 3, seven speaker icons on the circle (C) as follows:

- SFL: corresponding to the front left speaker (front left)
- SFR: corresponding to the front right speaker (front right)
- SSL: corresponding to the surround left speaker (left flank)
- SSR: corresponding to the surround right speaker (right flank)
- SSBL: corresponding to the surround back left speaker (back left)
- SSBR: corresponding to the surround back right speaker (back right), and
- SC: corresponding to the center speaker (front).

The user selects one of the seven speaker icons, and performs a moving operation (i.e., to move the selected ion clockwise or counterclockwise on the circle (C)). This causes the setting guidance section 31 to move the selected speaker icon by an angle $\Delta\theta$ along the circle in the direction designated by the moving operation.

Incidentally, in another example of this embodiment, the setting guidance section 31 may guide the setting of the position of each speaker within an angular range predetermined for each speaker. In this example, as depicted in FIG. 4, the number of the speakers involved determines the angular range within which to place each speaker of the speaker system. Specifically, in the example of FIG. 4 where the speaker system is equipped with seven speakers as mentioned above, the angular ranges are set as follows:

- from −45 degrees or more to −15 degrees or less (initial value is −30 degrees) for the front left speaker,
- from 15 degrees or more to 45 degrees or less (initial value is +30 degrees) for the front right speaker,
- from −120 degrees or more to −80 degrees or less (initial value is −90 degrees) for the surround left speaker,
- from 80 degrees or more to 120 degrees or less (initial value is +90 degrees) for the surround right speaker,
- from −160 degrees or more to −120 degrees or less (initial value is −135 degrees) for the surround back left speaker,
- from 120 degrees or more to 160 degrees or less (initial value is +135 degrees) for the surround back right speaker, and
- from −5 degrees or more to 5 degrees or less (initial value is 0 degrees) for the center speaker (front).

In this embodiment, the information regarding these angular ranges is stored in the storage section 12. Here, the speaker to be placed in the reference direction (center speaker in this case) may be set (fixed) only to the "0 degrees" angular range under control of the setting guidance section 31.

In the case where the speaker system is equipped with five speakers, the angular range for each speaker may be set likewise as follows:

- from −45 degrees or more to −15 degrees or less (initial value is −30 degrees) for the front left speaker,
- from 15 degrees or more to 45 degrees or less (initial value is +30 degrees) for the front right speaker,
- from −150 degrees or more to −90 degrees or less (initial value is −110 degrees) for the surround left speaker, from 90 degrees or more to 150 degrees or less (initial value is +110 degrees) for the surround right speaker, and zero degrees only for the center speaker (front).

In the case where the speaker system is equipped with two speakers, the angular range for each speaker may be set as follows:

from −5 degrees or more to −90 degrees or less (initial value is −30 degrees) for the front left speaker, and from 5 degrees or more to 90 degrees or less (initial value is +30 degrees) for the front right speaker.

In reference to those angular range settings, the setting guidance section 31 receives the setting of the position of each speaker in accordance with the user's operations. That is, when the user performs an operation to move the selected speaker icon clockwise, the setting guidance section 31 determines, with the selected speaker assumed to be currently positioned at the angle θ (the angle θ relative to the reference direction), whether or not the value of θ+Δθ is within the angular range associated with the selected speaker.

Here, if the value of θ+Δθ falls within the angular range associated with the selected speaker, the setting guidance section 31 updates the position of the selected speaker to θ+Δθ, i.e., the current angle θ plus a predetermined angle Δθ in accordance with the user's operation.

On the other hand, if the value of θ+Δθ is not within the angular range associated with the selected speaker, the setting guidance section 31 will not update the position of the selected speaker regardless of the user's operation. In this case, the setting guidance section 31 may notify the user of the inability to make the update by using a sound, a temporary inversion of the screen, or display of a dialog, for example.

Likewise, when the user performs an operation to move the icon of the selected speaker counterclockwise, the setting guidance section 31 determines, with the selected speaker assumed to be currently positioned at the angle θ (the angle θ relative to the reference direction), whether or not the value of θ−Δθ is within the angular range associated with the selected speaker (if θ−Δθ<−180, then it is assumed that θ−Δθ+360; the same also applies below).

Here, if the value of θ−Δθ falls within the angular range associated with the selected speaker, the setting guidance section 31 updates the position of the selected speaker to θ−Δθ, i.e., the current angle θ minus the predetermined angle Δθ in accordance with the user's operation. If θ−Δθ<−180, then the setting guidance section 31 updates the position to θ−Δθ+360.

On the other hand, if the value of θ−Δθ is not within the angular range associated with the selected speaker, the setting guidance section 31 will not update the position of the selected speaker regardless of the user's operation. In this case, the setting guidance section 31 may also notify the user of the inability to make the update by using a sound, a temporary inversion of the screen, or display of a dialog, for example. Incidentally, in the case where the angle at which to position the speaker is to be input by selection of the menu, the setting guidance section 31 presents the angles of the angular range by using the menu.

The above operations of the setting guidance section 31 allow the information processing apparatus 1 of this embodiment to receive the information regarding the angle of each speaker relative to the reference direction within a predetermined angular range set for each speaker in relation to the number of the speakers belonging to the speaker system, the received information being indicating the direction of each speaker of the speaker system. This prevents the user from erroneously positioning, for example, the front left speaker behind the user.

Further, in addition to or instead of making the settings within the angular ranges, the setting guidance section 31 may perform the following control when moving the icon of the selected speaker. That is, when the user moves the icon of the selected speaker, the setting guidance section 31 may perform control such that the selected speaker icon will not come too close to an adjacent speaker icon or will not skip over it when moved along the circle.

In this example, it is assumed that the reference direction (i.e., direction from the user position (U) to the position (D) of the video display device 2 in the example of FIG. 3) is "0" degrees and that the angles in the clockwise direction are positive angles. When the selected speaker icon is positioned at the angle θ relative to the reference direction (−180 degrees≤θ<180 degrees) on the circle C, the setting guidance section 31 performs the processes below in response to the user's operation to move the selected speaker icon clockwise.

The setting guidance section 31 acquires an angle α, relative to the reference direction, of the speaker icon adjacent clockwise to the selected speaker icon. When the difference between the acquired angle α and the angle θ indicating the position of the selected speaker icon $$d=|\theta-\alpha|$$

is below a predetermined critical angle θLimit or meets a given condition of clockwise skip-over (when θ, α>0 and θ≥α, or when 0>α>−Δθ and Δθ>θ≥0), the setting guidance section 31 will not update the position of the selected speaker icon regardless of the user's operation.

On the other hand, when the difference between the acquired angle α and the angle θ indicating the position of the selected speaker icon $$d=|\theta-\alpha|$$

is not below the predetermined critical angle θLimit and does not meet the given condition of clockwise skip-over, the setting guidance section 31 adds the predetermined angle Δθ to the current angle θ in accordance with the user's operation, thus updating the position θ of the selected speaker icon to θ←θ+θ. Preferably, the above predetermined critical angle θLimit may be set to 5 degrees, for example.

In this manner, when the setting guidance section 31 limits the range of movement of the selected speaker icon on the basis of the difference between its angle and the angle of the speaker icon adjacent thereto, the possibility of the user making erroneous setting of the speaker placement positions is minimized.

Suppose that in the example of FIG. 3, the speaker icon SFL corresponding to the front left speaker is moved clockwise by θΔ. At this point, where the speaker icon SFL is positioned to the left of the adjacent speaker icon SC (counterclockwise on the circle) and where the angle between the center speaker and the front left speaker as viewed from the user is below the predetermined critical angle θLimit, the speaker icon SFL corresponding to the front left speaker will not be moved further clockwise regardless of the user's operation. Also, where the speaker icon SFL is moved by Δθ clockwise and where the speaker icon SFL is positioned to the right of the speaker icon SC corresponding to the center speaker, the setting guidance section 31 will not move further clockwise the speaker icon SFL corresponding to the front left speaker regardless of the user's operation.

Likewise, in the example of FIG. 3, when the speaker icon SFL corresponding to the front left speaker is moved counterclockwise, the setting guidance section 31 performs control such that the speaker icon SFL will not skip over the adjacent surround left speaker icon SSL. The setting guidance section 31 further performs control such that the speaker icon SFL will not come close to the speaker icon SSL in a manner coming under the critical limit θLimit.

That is, with the selected speaker icon positioned at the angle θ (−180 degrees≤θ<180 degrees) relative to the reference direction on the circle C, suppose that the user performs an operation to move the selected speaker icon by the predetermined angle Δθ counterclockwise. Incidentally, it is assumed here that the reference direction (direction from the user position (U) to the position (D) of the video display device 2 in the example of FIG. 3) is "0 degrees" and that the clockwise direction is the positive angular direction.

When the above operation is carried out, the setting guidance section 31 acquires an angle β of the speaker icon adjacent counterclockwise to the selected speaker icon relative to the reference direction. The setting guidance section 31 then obtains the difference between the acquired angle β and the angle θ indicating the position of the selected icon:

$$d=|\theta-\beta|$$

If the difference "d" is below the predetermined critical angle θLimit or if the difference "d" meets a predetermined condition of counterclockwise skip-over (when θ, β>0 and θ≤β, or when 0>θ>−Δθ and Δθ>β≥0), the setting guidance section 31 will not update the position of the selected speaker icon regardless of the user's operation.

On the other hand, when the difference between the acquired angle β and the angle θ representing the position of the selected icon $$d=|\theta-\beta|$$

is not below the predetermined critical angle θLimit and does not meet the predetermined condition of counterclockwise skip-over, the setting guidance section 31 subtracts the predetermined angle Δθ from the current angle θ in accordance with the user's operation, thereby updating the position θ of the selected speaker icon to θ←θ−Δθ. Incidentally, if θ<−180 at this point, then the setting guidance section 31 further updates the value θ to θ←θ+360 degrees.

Incidentally, in the case where the setting of the angular range is used further, the setting guidance section 31 determines whether or not the updated angle is within the angular range. The setting guidance section 31 may then perform the update only if the updated angle falls within the angular range set in association with the corresponding speaker. Also, in the case where the angle of the speaker placement position is to be input by selection of the menu, the setting guidance section 31 may provide menu-based guidance such that the angular difference relative to the adjacent speaker is below the critical angle θLimit and that the selected speaker icon will not skip over the position of the adjacent speaker when moved.

When the user sets the position of each speaker of the speaker system 3 through processing by the setting guidance section 31 (e.g., when the user terminates adjustment of the speaker icon positions and clicks the "OK" button), the audio output setting information recording section 32 performs the following process. That is, the audio output setting information recording section 32 associates the information identifying each speaker of the speaker system 3 and received by the setting guidance section 31 at the time of the setting (e.g., when the "for example, OK" button is clicked) with the information regarding the position of the corresponding speaker (angle of the speaker relative to the reference direction as viewed from the user), and records the associated information to the storage section 12 as the audio output setting information (FIG. 5(*a*)). Incidentally, when the audio output setting information is found already recorded in the storage section 12, the audio output setting information recording section 32 overwrites the previously recorded audio output setting information with the newly input audio output setting information.

Upon receipt of a request for the audio output setting information from the application execution section 20, the setting management section 33 reads the audio output setting information recorded in the storage section 12.

The audio output setting information presentation section 34 subjects the audio output setting information read out by the setting management section 33 to processing by the application being executed by the application execution section 20. The above processing by the audio output setting information presentation section 34 is implemented by use of known techniques such as process-to-process communication and thus will not be discussed further.

[Recording of Audio Output Setting Information for Each Environment]

Incidentally, there may be cases where the video display device 2 or the speaker system 3 connected to the information processing apparatus 1 may change such as where the information processing apparatus 1 is portable. In such cases, the setting may not be performed for each change of environment. Instead, when the speaker positions are set by the user, the audio output setting information may be recorded in association with the information identifying the video display device 2 or the speaker system 3.

In this example, when the user sets the position of each speaker of the speaker system 3 through processing by the setting guidance section 31 (e.g., by adjusting the positions of the speaker icons and clicking the "OK" button), the audio output setting information recording section 32 acquires information identifying the video display device 2 being connected at this point in time. In the case where the video display device 2 is connected via an HDMI (registered trademark) (High-Definition Multimedia Interface), for example, the information identifying the video display device 2 may be HDMI identification information (e.g., EDID (Extended Display Identification DATA) of an HDMI).

The audio output setting information recording section 32 then generates the audio output setting information as the information associating the information identifying each speaker of the speaker system 3 and received by the setting guidance section 31 with the information regarding the positions of the corresponding speakers (angles relative to the reference direction as viewed from the user), and records the generated audio output setting information to the storage section 12 in association with the acquired information identifying the video display device 2 (FIG. 5(*b*)). In this case, where the audio output setting information associated with the information identifying the same video display device 2 is found already recorded, the audio output setting information recording section 32 overwrites the previously recorded audio output setting information with the newly input audio output setting information in association with the acquired information identifying the video display device 2.

Further, in the case where the audio output setting information associated with information identifying a video display device 2 different from the acquired information identifying the current video display device 2 is found already recorded, the audio output setting information recording section 32 does not overwrite the previously recorded audio output setting information and records the newly input audio output setting information in association with the acquired information identifying the different video display device 2.

In this example, the setting management section 33 operates as request reception means. Upon receipt of a request for the audio output setting information from the application execution section 20, the setting management section 33 acquires the information identifying the video display device 2 connected at the time of receiving the request. It is assumed that the information acquired here and identifying the video display device 2 is the same as that obtained by the audio output setting information recording section 32.

The setting management section 33 reads the audio output setting information recorded in the storage section 12 in association with the acquired information identifying the video display device 2.

The audio output setting information presentation section 34 then subjects the audio output setting information read out by the setting management section 33 to processing by the application program being executed by the application execution section 20.

In this manner, the information processing apparatus 1 can record the speaker placement settings of the speaker system 3 established for each video display device 2 to be connected. The information processing apparatus 1 can then make use of the speaker placement settings for the currently connected video display device 2 in processing by the application program.

Incidentally, explained above is the example in which the information acquired by the audio output setting information recording section 32 or by the setting management section 33 is recorded in association with the information identifying the video display device 2. Alternatively, the information obtained by the audio output setting information recording section 32 or by the setting management section 33 may not be the information identifying the video display device 2 but may be the information identifying the speaker system 3.

[Default Values]

When the user performs operations to make audio output settings and to have the audio output setting screen displayed, the setting guidance section 31 determines whether or not the audio output setting information is recorded in the storage section 12. When the audio output setting information is found recorded in the storage section 12, the setting guidance section 31 reads the stored audio output setting information and initializes the positions of the speakers displayed on the audio output setting screen to the positions of the corresponding speakers set in the retrieved audio output setting information.

On the other hand, if no audio output setting information is recorded in the storage section 12, the setting guidance section 31 sets predetermined default values. The default values to be adopted here may be those stipulated by relevant standards or specified by manufacturers.

Also, in the case where the audio output setting information is recorded in association with the information identifying the video display device 2 or the speaker system 3 connected to the information processing apparatus 1, the setting guidance section 31 may acquire the information identifying the connected video display device 2 (or speaker system 3) at the time of displaying the audio output setting screen, and determine whether or not the audio output setting information associated with the acquired information is recorded in the storage section 12.

Further, when the audio output setting information associated with the acquired information is found recorded in the storage section 12, the setting guidance section 31 reads the recorded audio output setting information, and initializes the positions of the speakers displayed on the audio output setting screen to the positions set in the retrieved audio output setting information. Further, if the audio output setting information associated with the acquired information is not found recorded, the setting guidance section 31 may set predetermined default values.

Also, when the setting management section 33 finds no audio output setting information recorded in the storage section 12 upon receipt of the request for the audio output setting information from the application execution section 20 (or when the audio output setting information associated with the information identifying the currently connected video display device 2, etc., is not found recorded), the setting guidance section 31 may output the predetermined default values.

[Operations]

The information processing apparatus 1 of this embodiment configured basically as described above operates as explained below. Incidentally, in the example that follows, the user is assumed to carry the information processing apparatus 1 between the living room and the bedroom for use in the respective rooms. The living room is assumed to be furnished with a 7.1 channel speaker system (including 7 speakers) 3*a* and a home-use television set as a video display device 2*a*. Further, the bedroom is assumed to be provided with a 2-channel speaker system (including 2 speakers) 3*b* and a monitor as a video display device 2*b*.

The user places the information processing apparatus 1 in the living room and connects it to the 7.1 channel speaker system 3*a* and to the video display device 2*a*. When the user operates the information processing apparatus 1 here to give instructions to perform the audio setting of the system, the information processing apparatus 1 causes the video display device 2*a* to display an audio setting menu list.

By manipulating the controller 4, the user selects from the menu list the audio output setting item for setting the speaker positions and carries out operations to perform the setting. This causes the information processing apparatus 1 to display the audio output setting screen.

On this screen, the user performs input specifying that the number of speakers is to be "7." This turns the audio output setting screen displayed by the information processing apparatus 1 into the state depicted in FIG. 3. In reference to the user position (U) and the position (D) of the video display device 2 on the audio output setting screen, the user regards the direction from the user position (U) to the direction (D) of the video display device 2 as the reference direction as viewed from the user, and sets the direction of the angle of the point at which each speaker of the speaker system 3*a* is placed on the circle (C) relative to the reference direction by moving the corresponding speaker icon on the circle (C).

For example, in the case where the surround left speaker SSL as viewed from the user's position is at an angle slightly back of the default angle under constraints of furniture positions in the living room, the user selects the speaker icon SSL corresponding to the surround left speaker and operates the controller 4 to give instructions to move the selected icon counterclockwise. Incidentally, for purpose of explaining this example, it is assumed that the surround left speaker SSL is initially positioned at the angle of −90 degrees and that the surround back left speaker SSBL is initially positioned at the angle of −120 degrees.

When the user performs an operation to move the selected speaker icon SSL counterclockwise, the information processing apparatus 1 acquires the angle after the movement as −90−Δθ degrees (e.g., if Δθ=5, then what is acquired is −95 degrees) with respect to the current position of −90 degrees of the selected speaker. The information processing apparatus 1 then determines whether or not the post-movement angle is within the angular range associated with the selected speaker.

Here, if the predetermined angular range associated with the surround left speaker SSL is from −120 degrees or more to −80 degrees or less, the acquired angle of −95 degrees falls within that angular range. The information processing apparatus 1 further obtains the difference between the position of the surround back left speaker SSBL adjacent counterclockwise (moving direction) to the surround left speaker SSL on one hand, and the post-movement position of the icon of the surround left speaker SSL on the other hand. Here, the difference (its absolute value) is |−120−(−95)|=25 (in this case, |x| means the absolute value of x). Since the difference is larger than the predetermined critical angle θLimit (e.g., it is assumed that θLimit=5), the information processing apparatus 1 sets the position of the surround left speaker SS to the angle of −95 degrees obtained as described above, thereby updating the displayed position of the icon of the surround left speaker SSL on the audio output setting screen.

Further, suppose that the user repeats the operation to move the surround left speaker SSL counterclockwise to shift its position to an angle of −110 degrees. If the user thereafter performs an operation to move the icon further counterclockwise, the information processing apparatus 1 acquires the angle after the movement as −110−Δθ degrees (when Δθ=5, what is acquired is −115 degrees). The information processing apparatus 1 then determines whether or not the post-movement angle is within the angular range associated with the selected speaker. At this point, the angle of −115 degrees falls within the angular range set for the corresponding surround left speaker SSL (from −120 degrees or more to −80 degrees or less). Then, the information processing apparatus 1 further obtains the difference between the position of the surround back left speaker SSBL adjacent counterclockwise (moving direction) to the surround left speaker SSL on one hand, and the post-movement position of the icon of the surround left speaker SSL on the other hand.

Here, the difference obtained above is |−120−(−115)|=5. Since the difference is below the predetermined critical angle θLimit (e.g., it is assumed that θLimit=the information processing apparatus 1 will not change the position of the surround left speaker SS regardless of the user's operation. That is, the surround left speaker SSL remains positioned at −110 degrees on the audio output setting screen.

If the user gives an instruction to terminate the setting here, the information processing apparatus 1 acquires the information identifying the currently connected video display device 2*a*, such as HDMI identification information (e.g., EDID of HDMI).

The information processing apparatus 1 then generates the audio output setting information as the information associating the information that is received from the user and identifies each speaker of the speaker system 3 with the information regarding the position of the corresponding speaker (i.e., speaker angle relative to the reference direction as viewed from the user). The information processing apparatus 1 records the generated audio output setting information to the storage section 12 in association with the EDID of the video display device 2*a* obtained above. Here, the following audio output setting information is recorded in association with the EDID of the video display device 2*a:*

Front left speaker at −30 degrees,
Front right speaker at +30 degrees,
Surround left speaker at −110 degrees (following the above-described movement),
Surround right speaker at +90 degrees,
Surround back left speaker at −120 degrees,
Surround back right speaker at +120 degrees, and
Center speaker at 0 degrees.

When the user activates a game application in the above state, the information processing apparatus 1 starts to process that game application. When the game application requests the audio output setting information from the system, the information processing apparatus 1 acquires the EDID of the HDMI as the information identifying the currently connected video display device 2*a*.

The information processing apparatus 1 then determines whether or not the audio output setting information associated with the acquired EDID of the video display device 2*a* is stored in the storage section 12. Since the audio output setting information associated with the EDID of the video display device 2*a* is stored as described above, the information processing apparatus 1 reads that audio output setting information for use in processing the game application. It does not matter how the audio output setting information is used here by the game application. The audio output setting information may be used, for example, in well-known processes such as the process of correcting the audio signal in keeping with the speaker placement so as to adjust the sound field.

Thereafter, the user may carry the information processing apparatus 1 into the bedroom and connect the apparatus to the 2-channel speaker system (including 2 speakers) 3*b* and to a monitor as the video display device 2*b*. When the user activates a game application, the information processing apparatus 1 starts to process that game application. When the game application during processing requests the audio output setting information from the system, the information processing apparatus 1 acquires the EDID of the HDMI as the information identifying the currently connected video display device 2*b*.

The information processing apparatus 1 then determines whether or not the audio output setting information associated with the acquired EDID of the video display device 2*b* is stored in the storage section 12. It is assumed here that the audio output setting information associated with the acquired EDID of the video display device 2*b* is not stored. In this case, the information processing apparatus 1 uses default audio output setting information in processing the game application. For example, the default audio output setting information may specify that the number of speakers is to be "2" and that the front left speaker and the front right speaker are to be positioned at −30 degrees and +30 degrees, respectively. The game application may use the information regarding the speaker positions specified in the default audio output setting information in such processes as the process of correcting the audio signal so as to adjust the sound field.

Here, by manipulating the controller 4, the user may select from the menu list the audio output setting item for setting the speaker positions and carry out an operation to perform the setting. This causes the information processing apparatus 1 to display the audio output setting screen. At this point, the information processing apparatus 1 acquires the EDID of the currently connected video display device 2*b* and determines whether or not the audio output setting information associated with the acquired EDID of the video display device 2*b* is stored. When the audio output setting information associated with the acquired EDID of the video display device 2*b* is not stored, the information processing apparatus 1 uses the default audio output setting information for displaying the audio output setting screen.

Further, on this screen, the user performs input specifying that the number of speakers is to be "2" (if the default number of speakers is "2," this input is skipped and subsequent settings are made). The information processing apparatus 1 displays an audio output setting screen corresponding to the speaker count of "2." The screen displayed by the information processing apparatus 1 is turned into the state depicted in FIG. 6(*a*). Incidentally, FIG. 6(*b*) depicts an example of the audio output setting screen corresponding to the speaker count of "5."

The user makes settings in reference to the user position (U) and the position (D) of the video display device 2 indicated on the audio output setting screen. For example, the user regards the direction from the user position (U) to the position (D) of the video display device 2 as the reference direction as viewed from the user. The user then sets the direction of the angle of the point at which each of the two speakers of the speaker system 3*b* is placed on the circle (C) relative to the reference direction by moving the corresponding speaker icon on the circle (C).

It is assumed here that the front left speaker is positioned at the angle of −25 degrees and that the front right speaker is positioned at the angle of +35 degrees. The information processing apparatus 1 generates the audio output setting information as the information associating the information identifying each speaker of the speaker system 3 with the information regarding the position of the corresponding speaker (i.e., angle relative to the reference direction as viewed from the user). The information processing apparatus 1 records the generated audio output setting information to the storage section 12 in association with the acquired EDID of the video display device 2*b*. Here, in association with the EDID of the video display device 2*b*, the following audio output setting information is recorded:

front left speaker at −25 degrees, and front right speaker at +35 degrees.

This audio output setting information is stored in the storage section 12 apart from the audio output setting information associated with the EDID of the video display device 2*a*.

Thereafter, the audio output setting information is read out as requested from the game application, for example. The information regarding the speaker positions indicated by the audio output setting information determined by the user is then used in such processes as the process of correcting the audio signal so as to adjust the sound field.

In this example of the information processing apparatus 1, when the user connects the information processing apparatus 1 to the video display device 2*a* in the living room and activates the game application, the audio output setting information associated with the EDID of the video display device 2*a* is subjected to processing by the game application. When the user connects the information processing apparatus 1 to the video display device 2*b* in the bedroom and activates the game application, the audio output setting information associated with the EDID of the video display device 2*b* is subjected to processing by the game application.

[Remote Control]

Furthermore, the information processing apparatus 1 of this embodiment may be controlled remotely over a network from a smartphone, a PC (Personal Computer), or another information processing apparatus 1 (collectively referred to as the terminal device, i.e., a device for outputting to the user the audio signal and video information generated by and received from the application program executed by the information processing apparatus 1) used by the user. In this example, the information processing apparatus 1 acquires information (such as screen size and screen ratio) regarding the video display device connected to the terminal device and renders the screen on the basis of the information regarding the video display device on the terminal device side, thereby generating information (i.e., screen information) for output to the terminal device side.

On the terminal device side, the screen information is received and output to the connected video display device for display. If the terminal device is a smartphone, its screen may serve as the video display device. If the terminal device is a PC or another information processing apparatus 1, a monitor or like equipment connected therewith corresponds to the video display device connected to the terminal device.

In this example, when the information processing apparatus 1 acquires the information identifying the connected video display device 2 or speaker system 3 by operation of the setting guidance section 31 or setting management section 33, the information processing apparatus 1 obtains the information identifying the video display device 2 or speaker system 3 connected to the terminal device for use by the user.

When the acquired information meets a predetermined condition, predetermined information is used as the information indicating the direction of each speaker of the speaker system. In the case where the obtained information fails to meet the predetermined condition, the audio output setting information recorded in association with the obtained information is output.

Here, the predetermined condition is assumed to involve determining whether or not the video display device 2 or speaker system 3 is not directly connected with the information processing apparatus 1. That is, in the case where the information processing apparatus 1 acquires the information identifying the video display device 2 or speaker system 3 used by the user and where the video display device 2 or speaker system 3 indicated by the acquired information is not directly connected to the information processing apparatus 1 (i.e., where the user uses the terminal device to access the information processing apparatus 1 via a network), predetermined default information is used as the audio output setting information indicating the direction of each speaker of the speaker system. Here, the default information is assumed to specify the settings of a speaker system having two speakers, with the front left and front right speakers set to be positioned at −30 degrees and +30 degrees, respectively.

In the case where the information processing apparatus 1 acquires the information identifying the video display device 2 or speaker system 3 used by the user and where the video display device 2 or speaker system 3 designated by the acquired information is found directly connected to the information processing apparatus 1, processing is performed by use of the audio output setting information recorded in association with the obtained information (where there is no audio output setting information recorded in association with the obtained information, the default information is used).

In another embodiment, where the information processing apparatus 1 acquires the information identifying the video display device 2 or speaker system 3 used by the user and where the audio output setting information recorded in association with the acquired information is stored in the storage section 12, processing may be carried out by use of the audio output setting information recorded in association with the acquired information regardless of whether or not the video display device 2 or speaker system 3 used by the user is directly connected.

In the other embodiment above, in the case where the information processing apparatus 1 has been connected in the past and where the terminal device is connected to the speaker system 3 and to the video display device 2 for which the positions of the speakers of the speaker system 3 have been set by the user, the information processing apparatus 1 obtains the audio output setting information indicating the position settings of the corresponding speakers based on the information identifying the video display device 2 and speaker system 3 connected to this terminal device. In this example, the information processing apparatus 1 outputs to the terminal device the audio signal processed by use of the audio output setting information recorded in association with the information identifying the video display device 2 and speaker system 3 connected to this terminal device.

[Where Terminal Device Retains Audio Output Setting Information]

In the case where the terminal device is configured to operate as the setting guidance section 31, the audio output setting information recording section 32, the setting management section 33, and the audio output setting information presentation section 34 of the information processing apparatus according to the present embodiment, processes may be carried out as explained below. In this example, given instructions from the user, the terminal device generates and retains the audio output setting information indicating the position of each speaker of the speaker system 3 connected to the terminal device.

Figure 7:
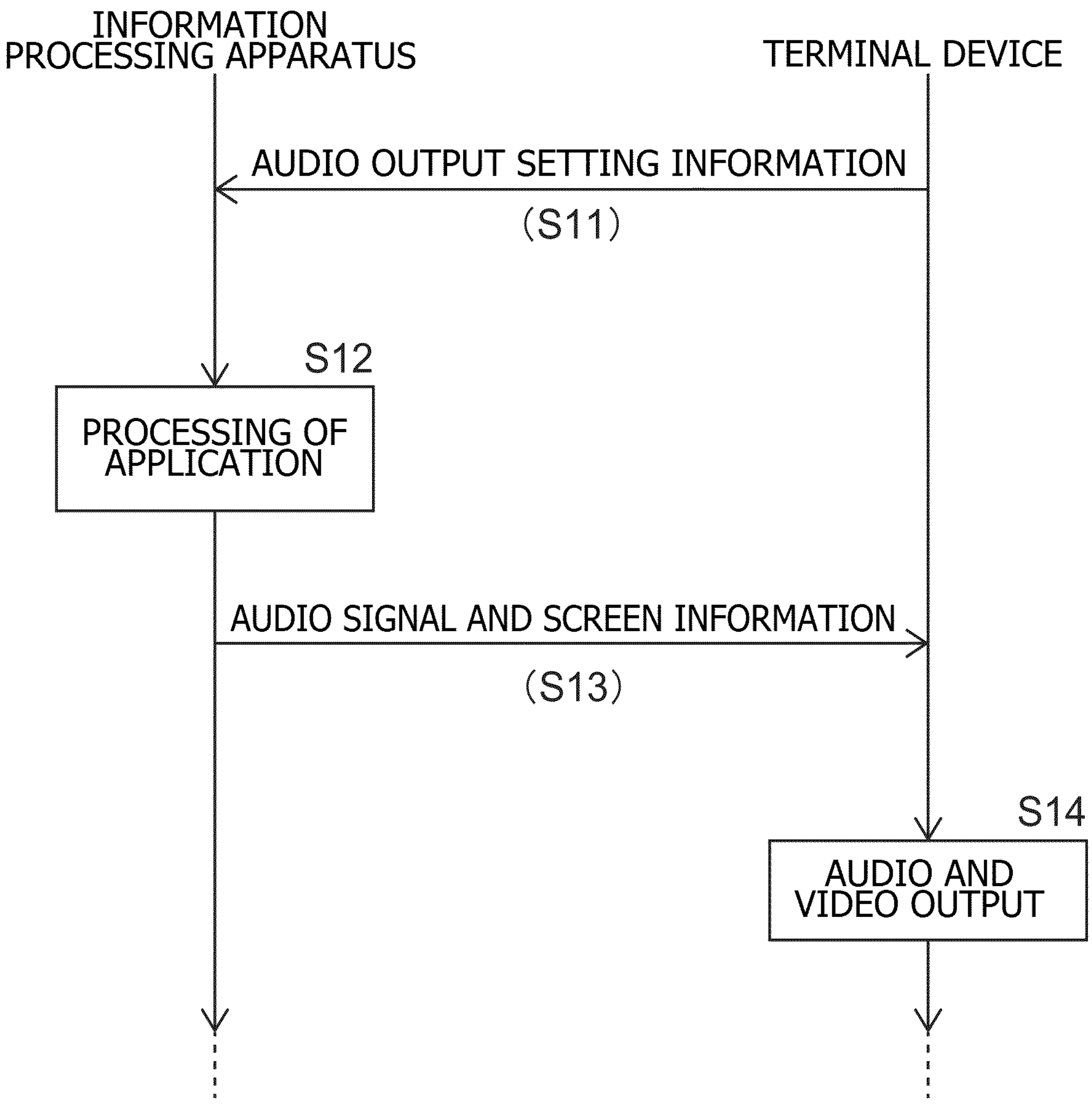
FIG. 7 is a flow diagram indicating exemplary operations performed by the information processing apparatus according to the embodiment of the present invention and by a terminal device.

As depicted in FIG. 7, upon access to the information processing apparatus 1, the terminal device outputs thereto the audio output setting information corresponding to the speaker system 3 connected to this terminal device (S11).

In this example, the information processing apparatus 1 receives input of the audio output setting information (i.e., information indicating the direction of each speaker relative to the orientation of the user) from the terminal device. At this point, the information processing apparatus 1 performs audio signal processing and other processes by using the audio output setting information input from the terminal device instead of the audio output setting information stored in the storage section 12 of the information processing apparatus 1 (S12). The information processing apparatus 1 outputs to the terminal device the processed audio signal and the screen information corresponding to the video display device 2 connected to the terminal device (S13). In turn, the terminal device causes the connected speaker system 3 to activate the audio signal and the video display device 2 to output the screen information (S14).

Incidentally, in the example involving the use of the terminal device, the user operates the controller connected to this terminal device. The information indicating the details of the operations is either processed by the terminal device itself or output to the information processing apparatus 1 depending on the selection made by the user. [Advantageous Effects of Embodiment] The embodiment discussed above make it possible to acquire and provide the information regarding the placement positions of the speakers for the user.

REFERENCE SIGNS LIST

1: Information processing apparatus
2: Video display device
3: Speaker system
4: Controller
11: Control section
12: Storage section
13: Operation control section
14: Output control section
15: Communication section
20: Application execution section
30: System processing section
31: Setting guidance section
32: Audio output setting information recording section
33: Setting management section
34: Audio output setting information presentation section

The invention claimed is:

1. An information processing apparatus that processes an audio signal, the information processing apparatus comprising processing circuitry configured to:

with a direction from a position of a user to a position of a video display device communicably coupled to the information processing apparatus regarded as a reference direction, receive information regarding an angle relative to the reference direction centering on the position of the user, the received information being audio output setting information indicating a direction of each of a plurality of speakers of a speaker system communicably coupled to the information processing apparatus;

upon receipt of the information regarding the angle relative to the reference direction, receive information regarding an angle of a target speaker within the angular range defined based on a difference between the angle of the target speaker and an angle of a speaker adjacent to the target speaker relative to the reference direction; and record the received audio output setting information, wherein the recorded audio output setting information is output as requested for use in processing the audio signal.

2. The information processing apparatus according to claim 1, wherein the processing circuitry is further configured to receive information regarding an angle of each speaker relative to the reference direction within an angular range predetermined for each speaker in association with the number of the speakers of the speaker system, the received information being the audio output setting information indicating the direction of each speaker of the speaker system.

3. The information processing apparatus according to claim 1, wherein the processing circuitry is further configured to record the received audio output setting information in association with information identifying either the video display device or the speaker system.

4. The information processing apparatus according to claim 3, wherein the processing circuitry is further configured to receive a request for the audio output setting information, wherein information acquired for the request includes information identifying either the video display device or the speaker system connected upon receipt of the request; and output the audio output setting information recorded in association with the acquired information.

5. The information processing apparatus according to claim 3, wherein the processing circuitry is further configured to receive a request for the audio output setting information;

upon receipt of the request, acquire information identifying either the video display device or the speaker system for use by the user;

output predetermined information as the information indicating the direction of each of the speakers of the speaker system when the acquired information meets a predetermined condition; and output the audio output setting information recorded in association with the acquired information in a case where the predetermined condition is not met.

6. The information processing apparatus according to claim 1, wherein the processing circuitry is further configured to receive, from a terminal device used by the user, input of information indicating the direction, relative to the orientation of the user, of each of the speakers of the speaker system connected to the terminal device, wherein, upon input from the terminal device of the information indicating the direction of each speaker relative to the orientation of the user, subject the input information instead of the recorded audio output setting information to processing of the audio signal.

7. A control method for controlling an information processing apparatus that processes an audio signal, the control method comprising:

with a direction from a position of a user to a position of a video display device communicably coupled to the information processing apparatus regarded as a reference direction, receiving information regarding an angle relative to the reference direction centering on the position of the user, the received information being audio output setting information indicating a direction of each of a plurality of speakers of a speaker system communicably coupled to the information processing apparatus;

receiving information regarding an angle of a target speaker within the angular range defined based on a difference between the angle of the target speaker and an angle of a speaker adjacent to the target speaker relative to the reference direction;

recording the received information as a setting; and outputting the recorded setting as requested for use in processing the audio signal.

8. The method according to claim 7, further comprising receiving information regarding an angle of each speaker relative to the reference direction within an angular range predetermined for each speaker in association with the number of the speakers of the speaker system, the received information being the audio output setting information indicating the direction of each speaker of the speaker system.

9. The method according to claim 7, further comprising recording the received audio output setting information in association with information identifying either the video display device or the speaker system.

10. The method according to claim 9, further comprising:

receiving a request for the audio output setting information, wherein information acquired for the request includes information identifying either the video display device or the speaker system connected upon receipt of the request; and outputting the audio output setting information recorded in association with the acquired information.

11. The method according to claim 9, further comprising:

receiving a request for the audio output setting information;

upon receipt of the request, acquiring information identifying either the video display device or the speaker system for use by the user;

outputting predetermined information as the information indicating the direction of each of the speakers of the speaker system when the acquired information meets a predetermined condition; and outputting the audio output setting information recorded in association with the acquired information in a case where the predetermined condition is not met.

12. The method according to claim 7, further comprising receiving, from a terminal device used by the user, input of information indicating the direction, relative to the orientation of the user, of each of the speakers of the speaker system connected to the terminal device, wherein, upon input from the terminal device of the information indicating the direction of each speaker relative to the orientation of the user, subject the input information instead of the recorded audio output setting information to processing of the audio signal.

13. A non-transitory computer-readable storage medium storing a program for an information processing apparatus that processes an audio signal thereon which, when executed by a computer, causes the computer to perform a method, the method comprising:

with a direction from a position of a user to a position of a video display device communicably coupled to the information processing apparatus regarded as a reference direction, receiving information regarding an angle relative to the reference direction centering on the position of the user, the received information being audio output setting information indicating a direction of each of a plurality of speakers of a speaker system communicably coupled to the information processing apparatus;

receiving information regarding an angle of a target speaker within the angular range defined based on a difference between the angle of the target speaker and an angle of a speaker adjacent to the target speaker relative to the reference direction;

recording the received information as a setting; and outputting the recorded setting as requested.

14. The non-transitory computer-readable storage medium according to claim 13, wherein the method further comprises receiving information regarding an angle of each speaker relative to the reference direction within an angular range predetermined for each speaker in association with the number of the speakers of the speaker system, the received information being the audio output setting information indicating the direction of each speaker of the speaker system.

15. The non-transitory computer-readable storage medium according to claim 13, wherein the method further comprises recording the received audio output setting information in association with information identifying either the video display device or the speaker system.

16. The non-transitory computer-readable storage medium according to claim 15, wherein the method further comprises:

receiving a request for the audio output setting information, wherein information acquired for the request includes information identifying either the video display device or the speaker system connected upon receipt of the request; and outputting the audio output setting information recorded in association with the acquired information.

17. The non-transitory computer-readable storage medium according to claim 15, wherein the method further comprises:

receiving a request for the audio output setting information;

upon receipt of the request, acquiring information identifying either the video display device or the speaker system for use by the user;

outputting predetermined information as the information indicating the direction of each of the speakers of the speaker system when the acquired information meets a predetermined condition; and outputting the audio output setting information recorded in association with the acquired information in a case where the predetermined condition is not met.

18. The non-transitory computer-readable storage medium according to claim 13, wherein the method further comprises receiving, from a terminal device used by the user, input of information indicating the direction, relative to the orientation of the user, of each of the speakers of the speaker system connected to the terminal device, wherein, upon input from the terminal device of the information indicating the direction of each speaker relative to the orientation of the user, subject the input information instead of the recorded audio output setting information to processing of the audio signal.

* * * * *